J. A. WALSH.
GRAIN SAVING DEVICE FOR THRESHING MACHINES.
APPLICATION FILED NOV. 16, 1914.
1,179,365.
Patented Apr. 11, 1916.
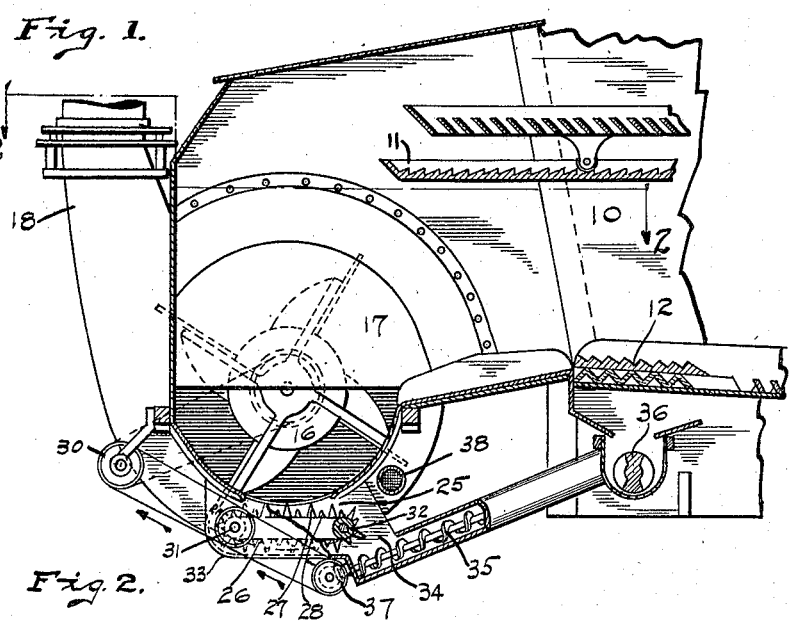
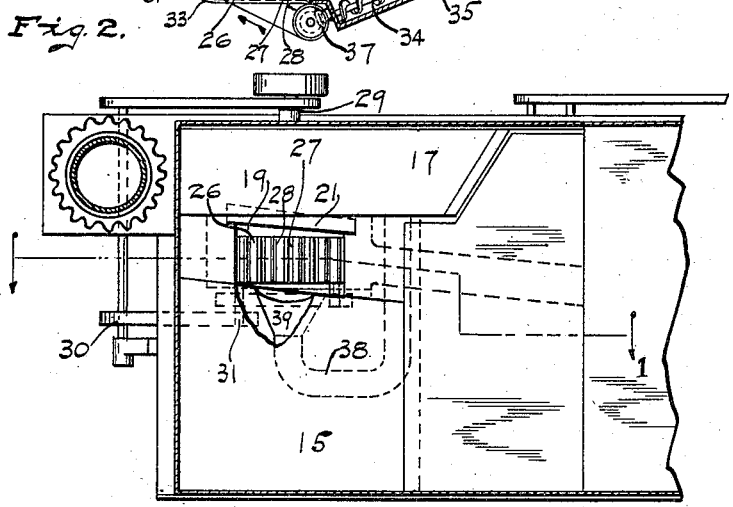
WITNESSES:
INVENTOR

UNITED STATES PATENT OFFICE.

JAMES A. WALSH, OF INDIANAPOLIS, INDIANA, ASSIGNOR TO THE INDIANA MANUFACTURING COMPANY, OF INDIANAPOLIS, INDIANA, A CORPORATION OF INDIANA.

GRAIN-SAVING DEVICE FOR THRESHING-MACHINES.

1,179,365.

Specification of Letters Patent. Patented Apr. 11, 1916.

Application filed November 16, 1914. Serial No. 872,329.

*To all whom it may concern:*

Be it known that I, JAMES A. WALSH, a citizen of the United States, residing at Indianapolis, in the county of Marion and State of Indiana, have invented certain new and useful Improvements in Grain-Saving Devices for Threshing-Machines, of which the following is a specification.

My invention relates to that class of grain saving devices for threshing machines which intercept and trap grain separated from straw during its passage from the threshing machine to the wind stacker, and consists in certain details of construction and arrangements of parts whereby I produce a movable grain trap which conveys the saved grain as it is being caught, so that it can be returned to the machine, or otherwise, in a simple but positive manner, as will be hereinafter more fully pointed out.

In the accompanying drawings, forming a part hereof, Figure 1 is a longitudinal sectional view through the rear end of a threshing machine, and a wind stacker, showing my invention in connection therewith, and Fig. 2 is a plan thereof taken on the dotted line 2—2 in Fig. 1.

In said drawings the portions marked 10 indicate a threshing machine, of any well known form, provided with a straw carrier, 11, and chaff riddle or winnower, as 12, which communicate with a material-receiving receptacle such as a wind stacker hopper, 15, the latter communicating with a burden fan, 16, positioned within a fan casing, 17, for discharging material through the stacker chute, 18, as usual.

The hopper, 15, may be of any desired form and has a portion of its end adjacent the fan casing cut away, as indicated at 19, Fig. 2. At the lower side of the fan eye a flanged, or other suitable member, 21, is provided, which constitutes a grain deflector. In said opening and suitably attached to the fan casing, or otherwise, is a combined grain trap and conveyer, 25, comprising an endless carrier, 26, provided with guides, 27, 28, the latter being less in height than the guides, 27, which grain trap is preferably operated from the stacker fan shaft, 29, or other source, by a suitable driving mechanism, 30, which communicates with shaft, 31, the trap being supported at its opposite end by an idler, 32. Said trap is inclosed within a suitable housing, 33, having an outlet, 34, and may communicate with a spiral or other conveyer, 35, which leads therefrom to the tailings auger, 36, or other part of the threshing machine, or otherwise, which conveyer may be driven from shaft 31 through suitable driving mechanism as 37. Also associated with said trap is a blast producing device, which may consist of a pipe, 38, leading from fan casing, 17, and having a distributing nozzle, 39, or any other suitable arrangement for the purpose may be employed.

In operation, the straw, chaff, and other material discharging from the thresher, or similar machine, falls into hopper, 15, such material containing an appreciable amount of loose grain and unthreshed heads of grain which had not been collected in the threshing machine. As this material moves along toward the stacker fan, 16, it is swept across the grain trap by the blast mechanism, hereinbefore indicated, the blast winnowing and separating the loose grain and unthreshed heads therefrom, which, being heavier, fall between the guides, 27, 28, while the lighter material is drawn in by the stacker fan and discharged through chute, 18. The material caught between the guides in the trap is thus shielded from the blast, that portion of which is driven under the deflector 21 falling downwardly between the guides, and all of which material is carried by the traveling trap and discharged into conveyer 35, or other suitable arrangement, and conveyed back to the thresher to be recleaned, or to any other desired point.

While I have shown the conveyer 35 as a means for conveying material into tailings auger 36, it will be understood, of course, that where desired such conveyer may be dispensed with so that the material may be discharged through outlet 34 onto the ground or into sacks or other receptacles; and if it is desired to convey such material to the rear of the stacker, said conveyer may be reversed so as to lead in such direction.

It will be noted that guides 27 and 28 vary in height, the upper sides of the former substantially alining with the deflector 21, while guides 28 are lower, which arrangement insures that the greater volume of material, such as straw and chaff, will readily ride across the higher guides into the fan eye, and the grain and unthreshed heads, or that portion thereof which strikes under the deflector, will be trapped between all of the guides.

I claim as my invention:

1. A grain saving device for threshing machines including a fan housing, a fan therein, a material receiving receptacle, and a movable grain trap interposed between said fan and said receptacle and adapted to capture grain and convey the same to a point of delivery.

2. A grain saving device for threshing machines, including a fan housing, a fan therein, a material receiving receptacle, and a movable grain trap interposed between said fan housing and said receptacle, said trap embodying guides between which grain is trapped.

3. In a grain saving device for threshing machines, a material receiving receptacle, a fan housing associated therewith, a fan in said housing, and a grain trap interposed between said receptacle and said fan housing and having guides of varying height over which straw is conveyed to said fan and between which grain is separated from straw.

4. A grain saving device for threshing machines, including a material receiving hopper, a fan housing communicating therewith, a fan in said housing, a movable grain trap interposed between it and said housing and associated with said receptacle, and a blast producing means associated with said trap for separating grain from other material entering said fan.

5. A grain saving device for threshing machines, including a fan housing, a fan therein, a material receiving receptacle, a combined trap and endless conveyer interposed between said fan housing and said receptacle, a housing for said trap having an outlet, and means for actuating said trap to convey grain through said outlet.

6. A grain saving device for threshing machines, including a fan housing, a fan therein, a material receiving receptacle, a movable grain trap interposed between said fan housing and said receptacle for separating grain from other material passing into said housing, a housing for said trap having an outlet, and means communicating with said housing for conveying away grain discharged from said trap.

In testimony whereof I affix my signature in the presence of two witnesses.

JAMES A. WALSH.

Witnesses:
BRUCE NIPPLE,
LEE R. GARBER.

Copies of this patent may be obtained for five cents each, by addressing the "Commissioner of Patents, Washington, D. C."